(12) United States Patent
Schiele et al.

(10) Patent No.: US 7,810,626 B2
(45) Date of Patent: Oct. 12, 2010

(54) VEHICLE TRANSMISSION COMPRISING A PARKING BRAKE AND METHOD FOR CONTROLLING THE SAME

(75) Inventors: Peter Schiele, Kressbronn (DE); Peter Ziemer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 687 days.

(21) Appl. No.: 11/662,109

(22) PCT Filed: Jul. 13, 2005

(86) PCT No.: PCT/EP2005/007621

§ 371 (c)(1),
(2), (4) Date: Sep. 24, 2007

(87) PCT Pub. No.: WO2006/027042

PCT Pub. Date: Mar. 16, 2006

(65) Prior Publication Data

US 2008/0035444 A1 Feb. 14, 2008

(30) Foreign Application Priority Data

Sep. 8, 2004 (DE) .................. 10 2004 043 416

(51) Int. Cl.
*F16H 63/38* (2006.01)
(52) U.S. Cl. ..................... 192/219.4; 701/70
(58) Field of Classification Search .............. None
See application file for complete search history.

(56) References Cited

U.S. PATENT DOCUMENTS

| 5,964,335 | A * | 10/1999 | Taniguchi et al. ........ 192/219.5 |
| 6,354,422 | B1 | 3/2002 | Kim |
| 6,736,754 | B2 | 5/2004 | Davids et al. |

FOREIGN PATENT DOCUMENTS

| DE | 100 40 127 A1 | 2/2002 |
| DE | 102 55 714 A1 | 6/2004 |
| JP | 2001-289317 | 10/2001 |
| JP | 2001-295922 | 10/2001 |
| JP | 2002-295657 | 10/2002 |
| JP | 2003-207039 | 7/2003 |

* cited by examiner

*Primary Examiner*—Rodney H Bonck
(74) *Attorney, Agent, or Firm*—Davis & Bujold, P.L.L.C.

(57) ABSTRACT

A vehicle transmission having shifting elements (A-E) and a parking brake for locking a drive train output and a method for controlling the transmission. Activation of the parking brake depends on a driver's control action. Deactivating the parking brake, when the vehicle is on a slope greater or lesser than a preset value and depending on the slope, a combination of shifting elements (A, D) or (B, D) frictionally slip, such that the output rotates against the strain on a parking brake locking element, caused by the slope, to partially eliminate this strain. Next, one of shifting elements (C, A or B) engages locking the output. The parking brake is then released and finally, the engaged shifting element (C or A or B) is disengaged in a regulated manner, such that the output can be driven according to the driver's control action.

25 Claims, 9 Drawing Sheets

| TIME t | SELECTOR LEVER POSITION | INDICATOR | PARKING BRAKE ENGAGED | A | B | E | C | D | MOTOR RPM n_mot |
|---|---|---|---|---|---|---|---|---|---|
| ↓ | P | P | X | | | | | | n_LL |
| | P → D1 | P | X | | | | | | (≥) n_LL |
| | D1 | P | X | X | | | | X | = f (grad.m.T) |
| | D1 | P | X | X | | | X | X | = f (grad.m.T) |
| | D1 | P → D | | (X) | | | X | X | ≥ n_LL |
| | D1 | D | | X | | | | X | ≥ n_LL |

GRADIENT (grad>positive threshold)

| TIME t | SELECTOR LEVER POSITION | INDICATOR | PARKING BRAKE ENGAGED | ENGAGED SHIFTING ELEMENTS | | | | | MOTOR RPM n_mot |
| --- | --- | --- | --- | --- | --- | --- | --- | --- | --- |
| | | | | A | B | E | C | D | |
| ↓ | P | P | X | | | | | | n_LL |
| | P → D2 | P | X | | | | | | (≥) n_LL |
| | D2 | P | X | X | | | | X | = f (grad.m.T) |
| | D2 | P | X | X | | | X | X | = f (grad.m.T) |
| | D2 | P → D | | (X) | | | X | X | ≥ n_LL |
| | D2 | D | | X | | | X | | ≥ n_LL |

GRADIENT (grad>positive threshold)

Fig. 3

| TIME t | SELECTOR LEVER POSITION | INDICATOR | PARKING BRAKE ENGAGED | ENGAGED SHIFTING ELEMENTS | | | | | MOTOR RPM n_mot |
|---|---|---|---|---|---|---|---|---|---|
| | | | | A | B | E | C | D | |
| ↓ | P | P | X | | | | | | n_LL |
| | P→N | P | X | | | | | | (≥) n_LL |
| | N | P | X | X | | | | X | = f (grad.m.T) |
| | N | P | X | X | | | X | X | = f (grad.m.T) |
| | N | P→N | | | | | X | X | ≥ n_LL |
| | N | N | | | | | | X | ≥ n_LL |

GRADIENT (grad>positive threshold)

| TIME t | SELECTOR LEVER POSITION | INDICATOR | PARKING BRAKE ENGAGED | ENGAGED SHIFTING ELEMENTS | | | | | MOTOR RPM n_mot |
|---|---|---|---|---|---|---|---|---|---|
| | | | | A | B | E | C | D | |
| ↓ | P | P | X | | | | | | $n\_LL$ |
| | P→R | P | X | | | | | | $(\geq) n\_LL$ |
| | R | P | X | X | | | | X | $= f(grad.m.T)$ |
| | R | P | X | X | | | X | X | $= f(grad.m.T)$ |
| | R | P→R | | | | | X | X | $\geq n\_LL$ |
| | R | R | | | X | | | X | $\geq n\_LL$ |

GRADIENT (grad>positive threshold)

| TIME t | SELECTOR LEVER POSITION | INDICATOR | PARKING BRAKE ENGAGED | ENGAGED SHIFTING ELEMENTS | | | | | MOTOR RPM n_mot |
|---|---|---|---|---|---|---|---|---|---|
| | | | | A | B | E | C | D | |
| ↓ | P | P | X | | | | | | n_LL |
| | P → D1 | P | X | | | | | | (≥) n_LL |
| | D1 | P | X | | X | | | X | = f (grad.m.T) |
| | D1 | P | X | | X | | X | X | = f (grad.m.T) |
| | D1 | P → D | | | | | X | X | ≥ n_LL |
| | D1 | D | | X | | | | X | ≥ n_LL |

GRADIENT (grad<negative threshold)

| TIME t | SELECTOR LEVER POSITION | INDICATOR | PARKING BRAKE ENGAGED | ENGAGED SHIFTING ELEMENTS | | | | | MOTOR RPM n_mot |
|---|---|---|---|---|---|---|---|---|---|
| | | | | A | B | E | C | D | |
| ↓ | P | P | X | | | | | | n_LL |
| | P → D2 | P | X | | | | | | (≥) n_LL |
| | D2 | P | X | | X | | | X | = f (grad.m.T) |
| | D2 | P | X | | X | | X | X | = f (grad.m.T) |
| | D2 | P → D | | | | | X | X | ≥ n_LL |
| | D2 | D | | X | | | X | | ≥ n_LL |

GRADIENT (grad<negative threshold)

Fig. 7

| TIME t | SELECTOR LEVER POSITION | INDICATOR | PARKING BRAKE ENGAGED | ENGAGED SHIFTING ELEMENTS | | | | | MOTOR RPM n_mot |
|---|---|---|---|---|---|---|---|---|---|
| | | | | A | B | E | C | D | |
| ↓ | P | P | X | | | | | | $n\_LL$ |
| | P → N | P | X | | | | | | $(\geq) n\_LL$ |
| | N | P | X | X | X | | | X | $= f(grad.m.T)$ |
| | N | P | X | X | X | | X | X | $= f(grad.m.T)$ |
| | N | P → N | | | | | X | X | $\geq n\_LL$ |
| | N | N | | | | | | X | $\geq n\_LL$ |

GRADIENT (grad<negative threshold)

| TIME t | SELECTOR LEVER POSITION | INDICATOR | PARKING BRAKE ENGAGED | A | B | E | C | D | MOTOR RPM n_mot |
|---|---|---|---|---|---|---|---|---|---|
| ↓ | P | P | X | | | | | | n_LL |
| | P→R | P | | | | | | | (≥) n_LL |
| | R | P | | | X | | | X | = f (grad.m.T) |
| | R | P | X | | X | | X | X | = f (grad.m.T) |
| | R | P→R | | | (X) | | X | X | ≥ n_LL |
| | R | R | | | X | | | X | ≥ n_LL |

GRADIENT (grad<negative threshold)

VEHICLE TRANSMISSION COMPRISING A PARKING BRAKE AND METHOD FOR CONTROLLING THE SAME

This application is a national stage completion of PCT/EP2005/007621 filed Jul. 13, 2005, which claims priority from German Application Serial No. 10 2004 043 416.6 filed Sep. 8, 2004.

FIELD OF THE INVENTION

The invention concerns a method for controlling a vehicle transmission with a parking brake for the positive locking of a drive of a drive train, as well as a vehicle transmission with a parking brake for the positive locking restraint of an output of a drive train.

BACKGROUND OF THE INVENTION

Vehicles with manual transmissions and the motor turned off can generally be secured from rolling away by way of a parking brake, and additionally by way of a gear, having with a high transmission ratio, being inserted into the transmission and locking an output of the drive train. In vehicles, the drive trains of which are configured with a hydrodynamic torque converter or a hydrodynamic clutch, this possibility does not apply since, with a turned off motor, a connection between the motor, with its braking power, and the drive cannot be maintained. In order to provide a safety feature against rolling away, even under extreme conditions, vehicles with hydrodynamic torque converters or hydrodynamic clutches are equipped with a separate device, which is normally integrated in the transmission as a parking brake, to secure the output.

Parking brakes of the type currently known in practice prevent an unintended rolling of the vehicle even with the motor turned off. If a parking brake is activated or engaged, then a transmission drive shaft which is connected to the drive wheels of the vehicle in a rotationally fixed manner, is locked in such a way that the vehicle is secured from rolling away of its own volition on level surfaces, as well as on slopes up to approximately a 30% grade. The activation of such parking brakes occurs by way of a driver in that he places a gearshift in a park position.

One implementation of the parking brake, known in practice, is implemented with a parking brake wheel connected in a rotationally fixed manner to a transmission drive shaft, which has a type of splined shaft profile on its outer diameter. A pawl is further provided, which radially grips the splined shaft profile of the parking brake wheel, in a positive locking manner when the parking brake is activated, whereby the transmission drive shaft is then locked.

When the parking brake is released, the pawl is released from gripping the parking brake wheel by way of a mechanical, hydraulic, or electrical mechanism, so that the parking brake wheel or the transmission drive shaft is unlocked and the output of the drive train is no longer locked. The release of the parking brake also occurs depending on a corresponding control action from the driver, in that the driver repositions the gearshift out of the park position and into another desired gearshift position.

In the case of the engaged parking brake, torque is applied to the drive wheels from the pawl by way of the transmission and the output. As an example, the torque is produced when a vehicle is facing in a forward driving position, either uphill or downhill and the force of the downhill grade on the vehicle is directed away from the drive direction by the drive train. Through locking the transmission drive shaft with the parking brake, the drive train is kept secure between the drive wheels and the parking brake. When the parking brake is disengaged, the strain of the drive train, which is passed by the chassis of the vehicle above the suspension point of the drive train, is suddenly released with a slight or a strong release jolt, which is especially pronounced in the case of steep slopes, and is disadvantageous for the driver, on one hand, as an unpleasant jolt and, on the other hand, is also noticeable as an unpleasant noise. Additionally, it strains the affected components of the transmission mechanically.

From DE 102 55 714 A1 of the Applicant, a method for controlling an automatic transmission with multiple shifting elements and a parking brake for positive locking restraint of the output of a drive train is known in which, simultaneous with the engagement of the positive locking parking brake, the output is locked by at least one engaged friction locking shifting element of the automatic transmission, such that a release jolt, occurring upon the release of the positive locking parking brake, is reduced, because possible movement between the drive wheels and the output of the vehicle is prevented when the brake is disengaged since the movement of the output is locked both before and after brake disengagement by the engaged friction locking shifting element. The strain on the output is preferably eliminated through a subsequent controlled disengagement of the engaged friction locking shifting element without a noticeable release jolt, by which an output can be rotated after the disengagement of this shifting element in accordance with a driver's control action. If an automatic transmission is already provided with a shifting element for frictionally locking the output, and also necessary for gear shifting and is constructed as a multiple disc clutch or multiple disc brake in the usual manner of construction, the pressurizing medium supply of this shifting element must always be guaranteed for the engaged parking brake, which leads to problems when the drive motor of the vehicle is turned off. Alternatively, the friction locking shifting element for the restraint of a drive could equally expensively be constructed so that it engages without pressure and disengages with application of a pressurizing medium. Correspondingly, the method in DE 102 55 714 A1 is not applicable in the same manner without problems in various transmission types.

The purpose of the present invention is the making of a vehicle transmission having multiple friction locking shifting elements and a parking brake for the positive locking restraint of an output of a drive train of the vehicle, and a universally applicable method of controlling such a vehicle transmission such that a disturbing release jolt upon release or disengagement of the previously engaged parking brake is avoided or reduced, and it is no longer viewed by the driver of the vehicle as disturbing.

SUMMARY OF THE INVENTION

Accordingly, in the inventive method, upon a driver controlled action for the deactivation of the positive locked parking brake, a current roadway gradient is greater than a predefined (first) positive threshold value or less than a predefined (first) negative threshold value is recognized, in an advantageous manner. First, with the parking brake still positively locked and depending on the indication of the current roadway gradient, shifting elements of the transmission in combination are made to slip in such a way that the output turns against the direction of strain acting on it when the parking brake is activated, until strain on the positively locked locking element of the parking brake is released or at least is reduced to such a degree that upon later mechanical release or disengagement of the parking brake, no disturbing release jolt occurs for the driver.

Finally, it is possible with the method, according to the invention, of temporarily locking the output of a drive train of the vehicle in an advantageous manner when the parking brake, which has been previously activated or engaged for the restraint of the drive, is released by way of at least one engaged friction locking shifting element of the vehicle transmission. This step of the method is especially important when the shifting elements previously activated to slip for releasing strain on the positively locked locking element of the parking brake results in the output of the vehicle rotating in a direction which does not correspond to the rotational direction of the output or of the driving direction corresponding to the driver controlled action. During the mechanical release or disengagement of the parking brake, the output of the vehicle is held by the frictional connection of the locked, frictionally locking shifting elements. If the parking brake is mechanically released or disengaged, the strain on the output can be reduced through a subsequent controlled or regulated disengagement of one of the previously engaged frictionally locking shifting elements without a noticeable release jolt. Simultaneous with the disengagement of the shifting element, engaged for restraining the output, a shifting element combination, which corresponds to the driving gear desired by the driver, is engaged so that, after the disengagement of the locking shifting element, the output can again rotate in the direction corresponding to the driver controlled action.

This method step, in which the output of the vehicle is held by frictionally locking shifting elements of the transmission on the transmission housing, can be dispensed with, if the vehicle can be driven in the direction intended by the driver with the shifting elements that have previously been made to slip for the reduction of strain on the engaged positive locking element of the parking brake.

The necessary combination of temporarily engaged shifting elements of the transmission for releasing the engaged positive locking element of the parking brake is, on one hand, a function of the direction of strain on the drive train of the vehicle, which preferably will be determined by the recognition of a slope by the vehicle or by the transmission and, on the other hand, is also a function of the gearing logic of the transmission and of the intended gear selected by the driver by way of the selector lever or of the selected gear of the currently active driving strategy. The gradient of the current roadway can be determined with the slope recognition system, for example, according to the measurement technology with a standard slope sensor or can be calculated by evaluation of appropriate distance data of a map-supported navigation system.

Upon the release or disengagement of the parking brake, since no disturbing release jolt occurs when the vehicle is parked on a level surface or on a slope with only a small roadway gradient, according to the invention, the method for the release or disengagement of the parking brake is only applied, as needed when the vehicle is parked and the parking brake is is activated or engaged; in a forward driving direction on a slope with a roadway gradient greater than the preset (first) positive threshold value, and if the vehicle with the activated or engaged parking brake is parked in a forward driving direction on a slope with a roadway gradient smaller than the preset (first) negative threshold value. In this regard, technically determined tolerances are especially considered with respect to a zero position of the slope recognition system of the transmission or of the vehicle. Thereby these threshold values of the current roadway gradient can, for example, be predefined as a fixed value, can be predefined dependent on the vehicle mass or can also be adaptively updated depending on the current mass of the vehicle.

In extreme operating conditions of the vehicle, such as when parking on an extremely steep slope or on a curb and depending on the transmission construction through the temporary engagement of the shifting elements of the transmission, it is possible that the output of the vehicle does not permit sufficient relaxation of strain to completely avoid a release jolt when the previously engaged positive locking element of the parking brake is disengaged, such that the force of disengagement of the previously engaged positive locking element of the parking brake is still too large. Such extreme operation conditions can be recognized or assessed, for example, from the current roadway gradient or with consideration given to the vehicle mass. Correspondingly, the invention can be provided in additional configurations, such that in the presence of such extreme operating conditions, the method is prematurely interrupted and the parking brake is immediately disengaged after reaching the maximum possible release of strain on the parking brake locking element and the gear desired by the driver is simultaneously shifted into or in the presence of such extreme operation conditions, the method is not started at all.

Thus, in a first configuration of the method, according to the invention, it is suggested that the method be prematurely discontinued and the parking brake be immediately disengaged and, insofar as is necessary, simultaneously shifting into the gear desired by the driver when a shifting force is larger than a predefined value. The shifting force can be provided, for example, through a force, pressure or torque measurement on the actuator system of the locking element of the parking brake or directly on the locking element. In a second configuration of the method, it is suggested that the method be prematurely terminated after the first method step upon attaining the maximum possible release of strain on parking brake and the parking brake be immediately disengaged and, as necessary, simultaneously shifting into the gear desired by the driver when the current roadway gradient is greater than a second positive threshold value or less than a second negative threshold value, when this second positive threshold value of the current roadway gradient is larger than the first positive threshold value required for the activation of the first method step and when the second negative threshold value of the current roadway gradient is smaller than the first negative threshold value of the current roadway gradient required for the first method step. Thereby this second positive threshold value and/or this second negative threshold value of the current roadway gradient can, for example, can be a predefined fixed value, which is defined depending on the vehicle mass or it can be adaptively updated depending on the current vehicle mass. In a third configuration of the method, it is suggested that the method be terminated before the first method step and the parking brake immediately disengaged, when the current roadway gradient is larger than the above second positive threshold value or less than the above second negative threshold value.

The inventive vehicle transmission advantageously includes multiple friction locking shifting elements for the operation of the vehicle in the forward driving direction, in multiple gears, as well as in a reverse driving direction depending on driver controlled actions; a parking brake for positive restraint of the output of the vehicle; a control for deactivating the parking brake and shifting the shifting elements, and a device for recognizing a slope of the vehicle or the roadway. Additionally, at least one frictionally locking shifting element of the transmission can be engaged for frictionally locking the output of the vehicle. According to the invention, controlling the transmission controls and the deactivation or disengagement of the parking brake, according to the previously described method, occur by a corresponding driver controlled action.

In the presence of a driver controlled action for the deactivation or disengagement of the parking brake, first, a drive train of the vehicle is driven, by engaging frictionally locking of friction locking shifting elements of the transmission in a combination depending on the gradient of the roadway, against the direction of strain present when the parking brake is activated or engaged and subsequently the output of the vehicle can be locked on the transmission housing by engaging the frictionally locking shifting elements of the transmission which are provided for engaging the drive, following which the positive engagement of the parking brake is released and subsequently the frictionally locking shifting elements of the transmission, which are engaged to lock the output, are disengaged again. Thus the output of the vehicle can be driven in relation to the driver controlled action. If the direction of strain, acting on the output, when the parking brake is activated, is different from the rotational direction of the output corresponding with the driver controlled action, a disengaged shifting element that is necessary for driving, in accordance with the driver controlled action is engaged at the latest at the beginning of the disengagement of the frictionally locking shifting element which is engaged to lock the output so that simultaneous with the disengagement of the shifting element which is engaged to lock the output, a shifting element combination is present, corresponding to the drive gear desired by the driver.

With the method according to the invention, torque stemming from a downhill-slope force-dependent strain on the output is effectively reduced during deactivation or disengagement of the previously activated or engaged positive parking brake, such that a release jolt, caused by the release of the positive locking of the parking brake, is avoided, at least in most operational conditions of the vehicle. During the mechanical release of the positively locked parking brake, if the output of the vehicle is additionally locked by frictionally locking, to the transmission housing, the shifting element of the transmission which is engaged to secure the output, the possibility also exists of reducing the strain over time, of the strained part of the output by a controlled or regulated disengagement of this shifting element and, if appropriate, to select a shifting element combination simultaneously or shortly before release through which comfortable drive of the vehicle in the driving direction desired by the driver is possible.

Thereby, it is immaterial whether the parking brake is configured as a transmission component, inside a housing of the vehicle transmission, or as a separate component of the drive train in connection with the output of the drive train of the vehicle. As possible designs of the vehicle transmission, automatic transmissions and automatic manual transmissions are given as examples.

Especially advantageous is the combination of the method according to the invention with a so-called "E-shifter" in which the working connection between the driver-operable gearshift and the transmission, is configured as an electrical connection. If a mechanical connection is provided between the driver-operable gearshift and the transmission, for example by way of a Bowden cable, it is also sensible to additionally install a mechanical, electromagnetic or electrohydraulic in the region of the parking brake to prevent the immediate mechanical release of the contact of the parking brake or the immediate mechanical disengagement of the locking element of the parking brake (usually a pawl) when the gearshift is moved to release the parking brake. Such an additional installation in the transmission can, for example, be arranged in a power flow direction between the Bowden cable and the mechanical pulling rod in the parking brake locking element, an electromagnet acting directly on the locking element or an electrohydraulic-activated hydraulic piston acting directly on the locking element. An additional installation in the gearshift can be a braking electromagnet, for example, acting directly on the gearshift, which prevents shifting the gearshift after biasing the gearshift in the direction of the position following the position "P" long enough that the locking element of the parking brake is released by temporarily engaging the frictionally locking shifting elements of the transmission.

In an advantageous configuration of the invention it is recommended that in controlling the shifting elements within the framework of the method, in addition to the roadway gradient, the vehicle mass or transmission temperature are also considered alternatively. The vehicle mass can be given as a fixed predefined value but, for example, also as an adaptively updated value, which is updated by a continuous comparison between theoretical driving performance and current driving performance. Insofar as the requirements are met with respect to the vehicle, the vehicle mass can also be determined as a current value within the framework of the method, with the use of data from an undercarriage of the vehicle as, for example, a signal from the leveling control system of a vehicle axle, as wheel-specific pressure values of air cushions or air suspensions or as the deflections of individual axles or wheels in connection with the spring stiffness of steel springs. If the vehicle is capable of pulling a trailer, it is suggested that the trailer mass, especially in the form of a predefined value, which corresponds to approximately half of the total permissible mass of the trailer, is to be considered in the control of the shifting elements within the framework of the method, such that the pulling a trailer by the vehicle is recognized through the electrical connection between the vehicle and the trailer, especially by way of a switch on the vehicle's electrical trailer socket or of monitoring the electrical resistance between pins of the vehicle's electrical trailer socket.

BRIEF DESCRIPTION OF THE DRAWINGS

The invention will now be described, by way of example, with reference to the accompanying drawings.

In the following, the invention is now more closely explained on the basis of additional implementation examples. Shown are:

FIG. 1A is a shifting diagram of the automatic transmission, according to FIG. 1;

FIG. 3 is a second shifting diagram of the method, according to the invention, with a shift of the gearshift from P→D2 on a positive roadway slope;

FIG. 7 is a second shifting diagram of the method, according to the invention, with a shifting of the gearshift from P→D2 on a negative roadway slope;

DETAILED DESCRIPTION OF THE INVENTION

Figure 1:
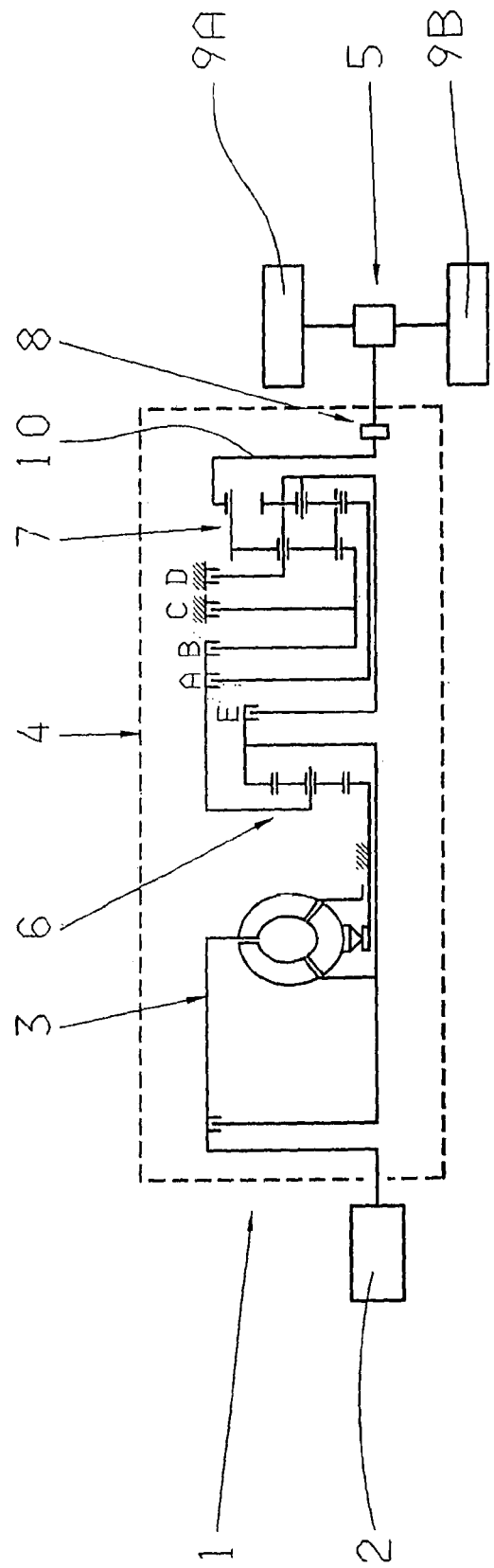
FIG. 1 is a schematic drive train of a vehicle with a starting element, an example transmission and a transmission with restrained output.

FIG. 1 shows schematically a drive train 1 of a motor vehicle, which comprises a drive motor 2 in the form of an internal combustion engine; a starting element 3, configured as a hydrodynamic torque converter; a transmission 4 and an output 5. The transmission 4 is, for example, an automatic power shift transmission, having a simple first planetary set 6 on the input side of the transmission and a second planetary set 7 on the output side of the transmission, designed as a Ravigneaux planetary wheel set. For the implementation of various speed ratios or gear ratios of the transmission 4, five shifting elements A through E are arranged between the two planetary sets 6 and 7, and are configured, in the known manner, as multiple disc clutches and multiple disc brakes. Depending on the actuation of the shifting elements A through E, a drive torque of the drive motor 2 can be passed at various speeds of the transmission 4 to the output 5. From the transmission scheme, it can be seen that a drive shaft 10 of the transmission 4 is frictionally locked to the transmission housing, when the shifting elements C and D or the shifting elements A, B and D are simultaneously engaged. Obviously the layout and all components of the drive train 1 represented in FIG. 1, are to be seen as representative of the transmission concept or the transmission type.

The drive train 1 is controlled by way of at least one control device (not represented in greater detail), which is connected to the gearshift (also not represented in greater detail). By way of the gearshift, it is possible for the driver to generate various driver controlled actions, according to the known art and manner. By use of the gearshift, various driver controlled actions are possible, such as forward or reverse, neutral and park positions.

If the gearshift is placed in the forward drive position in the above transmission, six different forward gear ratios or speeds can be set by selective engagement of the shifting elements A, B, E, C and D with the control device, and are ordinarily configured, in dependence on various driving programs stored automatically in the control device by the manufacturer. However, if the neutral position of the gearshift is selected, the transmission of power between the drive motor 2 and the output 5 is interrupted in the region of the transmission. If the gearshift position for reverse driving is engaged, a reverse gear ratio is implemented by way of the control device in the present transmission. An exam pie shifting diagram of this automatic transmission 4 is represented in FIG. 1A.

Returning to FIG. 1, a parking brake 8 of the automatic transmission 4, for locking the output 5 is described. If the driver moves the gearshift into a park position "P", the parking brake 8 is activated and the output 5 is positively locked. In this state, the vehicle cannot move in a forward or a reverse direction, since drive wheels 9A, 9B are positively held in a rotationally fixed manner by the assembly 8 for restraining the output 5.

The parking brake 8 comprises a parking brake wheel connected in a rotationally fixed manner with the drive shaft 10 of the transmission, and a pawl, such that when the parking brake 8 is activated, the pawl positively grips a circumference of the splined shaft profile of the parking brake wheel and thus restrains or locks the output 5 of the drive train 1 in a rotationally fixed manner. The parking brake 8 of the automatic transmission 4 is designed in the known art and manner and, therefore, is not represented in greater detail in FIG. 1.

With FIGS. 2 through 9, the method according to the invention and the vehicle transmission according to the invention, which can be controlled with this method, will be explained in more detail as follows, with the same symbols being used in all Figures to represent similar information.

Figures 2, 2A:
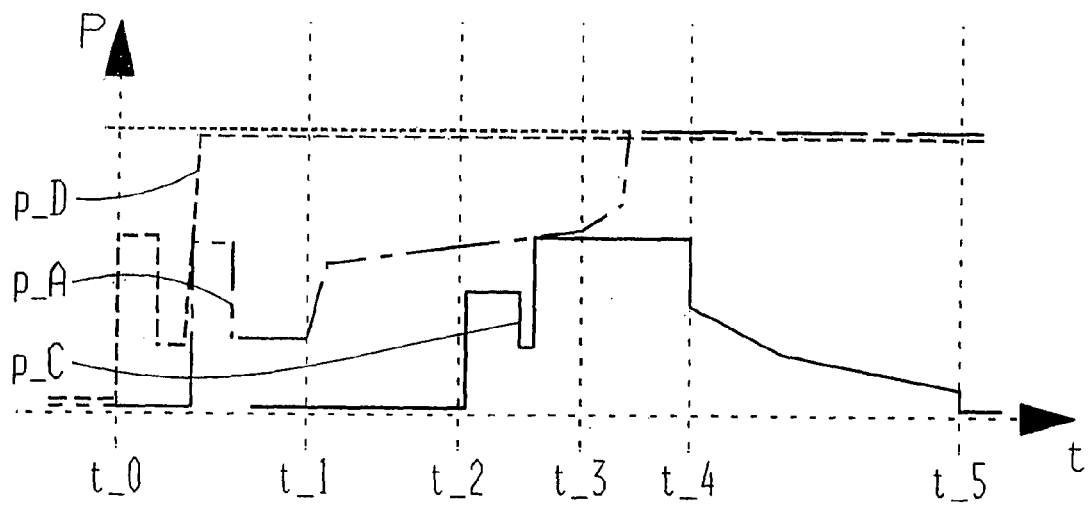
FIG. 2 is a first shifting diagram of the method, according to the invention, with a shift of the gearshift from "P→D1" on a positive roadway slope.
FIG. 2A is a time progression of shifting the gearshift, according to FIG. 2.

FIG. 2 shows a first shifting diagram of the method, according to the invention, with a driver controlled shifting of the gearshift from "P→D1", with the vehicle, at the time of shifting the gearshift, as seen by the driver when in a forward driving direction, is parked on a roadway gradient by an activated or engaged parking brake 8. The gearshift position "P" indicates a parked position of the transmission 4 or of the vehicle and a gearshift position "D1" represents a forward driving position with automatic gear selection and the driving ratio "first gear." Thereby, this shifting diagram corresponds to a chronological progression of the individual method steps for disengagement of the parking brake 8, which is indicated by an arrow representing time t. Further listed in the shifting diagram are a gearshift position indicator, provided in the vehicle for informing the driver of the actual state of the gearshift positions or the actual state of the shift of his gearshift position in the transmission, information indicating whether the parking brake 8 is currently mechanically engaged or not, information indicating which shifting elements A through E are currently engaged, as well as information about a current rotational speed n_mot of the motor 2 of the vehicle connected to the transmission 4.

As shown in FIG. 2, the first line of the constitutional diagram describes the initial state of the gearshift before being moved by the driver: the gearshift position is in the park position "P", the parking brake 8 is mechanically engaged and such that output 5 of the vehicle is positively locked; all shifting elements A through E of the transmission 4 are disengaged, the rotational speed n_mot of the motor 2 correspond to a neutral rotational speed n_LL, when the vehicle is parked in a forward driving direction on a positive slope, with a roadway gradient grad greater than a predefined positive threshold value. The gearshift position, insofar as it is present, shows "P" and informs the driver that the vehicle is in a parked position or that the parking brake 8 is engaged. The current roadway gradient grad is given by the slope recognition system of the transmission 4 or of the vehicle by way of measurement with a standard slope sensor or by calculation by evaluation of appropriate travel data from a map-supported navigation system.

The second line of the shifting diagram describes the state in which it is determined whether the driver wishes to leave the park position "P" and into which driving position he wishes to shift and if the vehicle, as seen from the forward driving direction, is facing a positive or a negative slope. In the present example the driver moves the gearshift from the position "P" to "D1", with the gearshift position "D1" here representing the forward driving range of the transmission 4, in that the transmission control of gear selection automatically selects the first gear of the transmission 4 as the starting gear or starting drive ratio. Corresponding to the shifting diagram according to FIG. 1A for the example automatic transmission 4 according to FIG. 1, for the implementation of the first forward gear ratio in the transmission 4, the two frictionally locking shifting elements A and D must be engaged. During the gearshift movement "P→D1" by the driver, the parking brake 8 is still mechanically engaged, all shifting elements A through E of the transmission 4 are still disengaged, the motor 2 usually still turns with neutral rotational speed n_LL, but can also rotate via a motor controller with slightly increased rotational speed n_mot. Upon recognition of the driver controlled action to release or disengage the parking brake 8, the operation proceeds since, in the represented example, the recognized slope of the transmission 4 or of the vehicle is a sufficiently large positive roadway gradient grad, e.g., the vehicle is parked vehicle in the forward driving direction on a sufficiently steep slope. The gearshift position indicator, if present, again shows "P".

The third line of the shifting diagram describes the subsequent step of the method, according to the invention, in which the strain on the drive train 1 of the vehicle is at least reduced to such a degree that the subsequent release of the positively locked parking brake 8 no longer causes a disturbing release jolt. The direction of strain on the drive train 1 of the vehicle by the engaged positive parking brake 8 is independent of whether the future driving direction, selected from the parking position, is forward or reverse, but is only dependent on the direction of the roadway gradient. Correspondingly, the strain torque on the drive train 1 is primarily a function of the actual downhill-slope force on the vehicle, is primarily a function of a current vehicle mass m and of the roadway gradient grad. In consequence of the vehicle's initial state, "parking brake engaged plus vehicle on a slope", the strain on the drive train 1 of the vehicle is exerted, in the present case, in the reverse driving direction. Therefore according to the invention in the method step of the third line of the shifting diagram, with the engaged parking brake 8 and indication "P" of the gearshift position being unchanged, a shifting element combination is controlled, to correspond to the first forward gear of the transmission 4. Thereby, both frictionally locked shifting elements A and D are made to slip thus delivering torque in such a way that the gravitational force of the slope), working through the drive shaft 10 of the transmission 4 on the locking element or the parking brake pawl of the parking brake 8, is eliminated or at least substantially reduced or even slightly overcompensated.

In this operational state in the transmission 4, on one hand, in order to guaranteed a sufficient leverage provision and, on the other hand, in order to guarantee a sufficiently high transmission drive torque for the elimination of the downhill-slope force, the invention can be configured such that the rotational speed n_mot of the motor 2, which are normally very low in neutral and as needed also the torque of the motor 2 can be increased in the method step of the third line of the constitutional diagram, such a rotational speed and torque increase is given or controlled, for example, as a function of the current roadway gradient grad, the vehicle mass m, a transmission temperature T and/or parameters of the starting element 3 or the torque converter of the transmission 4. Obviously, instead of the transmission temperature T, a substitute temperature of the motor or of the coolant of the vehicle, representing the temperature of the transmission, can be used. The vehicle mass can, for example, be given as a constant predefined value, but can also be an adaptively updated value, which is updated by continuous comparison between theoretical driving performance and actual driving performance. Further possibilities for determining the current vehicle mass m occur with the use of data from the manufacturer of the vehicle, such as a signal or level regulation system of a vehicle axle, as individual wheel pressure values of air cushions of an air suspension or the deflection of the individual axles or of individual wheels in connection with the spring stiffness of steel springs. A possible additional trailer mass, which is known to also influence the downhill-slope force on the vehicle, for example, can be automatically added to the mass of the pulling vehicle when it is recognized that the vehicle is pulling a trailer. The pulling of a trailer by the vehicle can, likewise, be recognized simply through the electrical connection between the vehicle and the trailer, by way of a switch on the vehicle side of the electrical trailer socket, or by surveillance of the electrical resistance between pins on the vehicle side of the electrical trailer socket. The trailer mass, under consideration, can also be estimated from a constant value, which corresponds to approximately half of the permissible total weight of the trailer.

The fourth line of the shifting diagram describes the subsequent step of the method according to the invention, in which the output 5 of the vehicle, restrained with the parking brake 8, is released from strain or partially released from strain by the engagement of an additional frictionally locking shifting element on the housing of the transmission 4. Additionally, with the still engaged parking brake 8 and unchanged indication "P" of the gearshift position, the shifting element C is engaged, in addition to the shifting elements A and D which were engaged in the previous method step. The current pressure level of the three shifting elements A, D and C is allocated in such a manner that the transmission 4 is locked or the torque on the drive shaft 10 of the transmission 4, due to the downhill-slope force on the vehicle, is counteracted. In connection with this, similar to the previous method step, an increase of the rotational speed n_mot of the motor 2 to a level greater than the neutral rotational speed n_LL, and an increase of the torque of the motor 2 can be effected, to guarantee the availability of leverage of the transmission 4 and the transmission starting torque necessary to overcome the downhill-slope force, with the rotational speed increase or torque increase can be described according to a similar algorithm as in the previously described method step, as the function of the current roadway gradient grade the vehicle mass m, a transmission temperature T and/or of parameters of the starting element 3 or the torque converter of the transmission 4.

Differing from the embodiment in FIG. 2, the method steps represented in line four can be completely eliminated in another embodiment of the method, according to the invention represented in line four, in which the output of the vehicle is held by a frictionally locking shifting elements of the transmission to the transmission housing, since the shifting elements A and D, previously engaged for reduction of the strain on the engaged positive locking element of the parking brake 8, in the present case, enable driving the vehicle in the gear "D1" as selected by the driver possible.

The fifth line of the shifting diagram, according to FIG. 2, describes the subsequent step of the method, according to the invention, in which the positively locked parking brake 8 is disengaged, e.g., the parking brake 8 is mechanically disengaged. Correspondingly, information concerning the engagement status of the parking brake 8 is changed, as well as the indicator of the gearshift position, if present, while in contrast the three shifting elements A, D, and C remain engaged. In the provided information concerning the shifting element A, the bracket indicates that this shifting element A is not necessary for the frictionally locked output 5 and, therefore, does not necessarily need to be engaged. A possible previously activated rotational speed increase for the motor 2 is neglected in this method step such that the motor 2 is again rotated at the neutral rotational speed n_LL or with a slightly increased rotational speed n_mot, with neutral regulation of the motor control appropriate to the motor load.

The sixth line of the shifting diagram describes the subsequent last step of the method according to the invention, wherein the shifting element C, previously locking the drive shaft 10 of the transmission 4 in a state that the positive locking brake 8 was relieved of strain or partially relieved of strain, is disengaged at this point in a controlled or regulated manner such that starting the vehicle in the forward driving direction, desired by the driver, is now possible. Correspondingly, the provided information concerning the shifting status of the shifting element C changes. The shifting elements A and D, which remain engaged, constituting the first forward gear ratio in the transmission 4 correspond with the shifting diagram represented in FIG. 1. The gearshift position indicator shows the driving region "D1" selected by the driver at the beginning of the function and informs the driver that driving of the vehicle corresponding to his driver controlled action is now possible.

For further disclosing of the chronological procession of the method according to the invention, the chronological procession of shifting element pressures, as shown in FIG. 2A, with regard to shifting the gearshift from "P→D1", represented according to FIG. 2, with the passage of time as the abscissa and a pressure p of the involved shifting element as the ordinate. With p_A, a pressure trend of the shifting element A is indicated, and p_C indicates a pressure trend of the shifting element C, and p_D indicates a pressure trend of the shifting element D, with the time again indicated with t. Obviously, all represented pressure trends are to be taken as examples, especially regarding the pressure levels, the ramping trends, and the timings of the individual (known as such) shifting phases (such as rapid filling phase, pressure equalization or pressure retention phase, load transfer phase, locking pressure or shifting final pressure phase). On the time axis, five discreet time points t_0, t_1, t_2, t_3, t_4, and t_5 are listed, which clearly define transitions occurring in the course of the shifting according to the invention.

Time point t_0 marks the beginning state of the method, according to the invention, corresponding to the second line of the shifting diagram, according to FIG. 2. At time point t_0, the transmission 4 is in the park position "P" with the parking brake engaged, the driver's shifting command from "P→D1" for leaving the park position "P" and engaging the forward driving gear "D1" with the first gear of the transmission 4 as the starting gear, is detected and recognized by way of the gearshift position. The slope recognition system of the transmission 4 or of the vehicle recognizes that the vehicle, as seen from the forward driving direction, is located on a slope with a sufficiently large (positive) roadway gradient (grad) to start the method. In the represented example, at the time point t_0, none of the three shifting elements A, D and C relevant for the shifting sequence is engaged, e.g., all the shifting elements A, D and C relevant for the shifting sequence are not pressurized. If multiple frictional shifting elements are required for a later driving sequence, based on the type of construction of the transmission, the pressure sequence of the shifting method can be provided in another configuration differing, for example, from the example represented in FIG. 2A, in that at least one of the shifting element necessary for starting—here especially the shifting element D, which is necessary for both the first forward gear as well as the reverse gear—is already pressurized in the park position "P" so that a piston of this shifting element is already engaged on the multiple disc set of this shifting element or that one (or all except one) of the shifting elements, necessary for starting, are already locked in the park position "P".

The time points t_0 and t_2 mark the chronological time points of the method step, according to the invention, represented in the third line of the shifting diagram according to FIG. 2. Within the time frame between time points t_0 and t_2, the two shifting elements A and D are engaged (pressure curves p_A and p_D), where here, for example, the shifting element D is brought to a locking pressure, before the shifting element A accepts the torque. At time point t_1, the shifting element A is also pressurized. Within this time frame, between the time points t_1 and t_2, the shifting element A assumes the torque. Corresponding to the shifting diagram, according to FIG. 1 of the transmission 4, the controlled shifting element combination "A+D" correspond to the first forward gear ratio of the transmission 4 so that, corresponding to the roadway gradient (grad) in the reverse driving direction, the strain on the drive train 1 of the vehicle begins to be reduced when torque assumption by the shifting element A is begun. At time point t_2, the engaged positively locked parking brake 8 is disengaged.

Time points t_2 and t_3 mark the chronological time point of the method, according to the invention, represented in the fourth line of the shifting diagram according to FIG. 2. Within the time frame, between time points t_2 and t_3, the shifting element C is engaged (pressure course p_C) so that, no later than time point t_3, the drive shaft 10 of the transmission 4 is locked against the transmission housing. Through the various pressure levels of the shifting pressure trends p_C, p_D of the shifting elements C, D, indicated in FIG. 2A, it is possible to individually control or regulate the current shifting pressure within the framework of the engaged shifting elements of the function. Thus in the present embodiment, the shifting pressure p_C of the shifting element C, which is again later disengaged in the course of the method after the mechanical disengagement of the parking brake 8 is lower than the shifting pressure p_D of the shifting element D, which also remains engaged even after disengaging the shifting element C.

Time points t_3 and t_4 mark the chronological time point of the method represented in the fifth line of the shifting diagram, according to FIG. 2, in which the positively locked parking brake 8 is mechanically disengaged so that, no later than time point t_4, the output 5 of the vehicle is still only held by frictionally locking the shifting elements D and C (pressure trends p_D and p_C). Depending on the transmission design type, the shifting element A (pressure trend p_A), which is, likewise, still engaged, does not participate in frictionally locked output 5 of the vehicle to the transmission housing. Correspondingly, the shifting element A could, deviating from the representation in FIG. 2A, also be inactive, in other words, not be pressurized, or could be pressurized at a reduced level.

Time point t_4 also marks the starting point of the method step represented in the sixth line of the shifting diagram, according to FIG. 2. As can be seen from FIG. 2A, beginning at time point t_4, the pressure p_C of the shifting element C is reduced by a defined algorithm. Preferentially, the transmission capacity of this shifting element C is reduced in such a manner that a strain torque on the output 5 of the vehicle is continuously reduced. In the present embodiment, the pressure rend p_C shows the shift of a pressure drop of a defined value and a subsequent two-step pressure reduction ramp. Depending on the application of the pressure reduction on the shifting element C, the driver can start the vehicle more or less quickly after the time point t_4 depending on his driving request. The service professional will also provide another algorithm, as necessary, for disengaging the shifting element C, for example for the reduction of the transmission capacity of the shifting element C either suddenly or through a freely applicable ramping function, or through a defined filter function at least approaching a parabolic shape. No later than time point t_5, the shifting element C, previously engaged for the locking of the output 5, is again without pressure and the transmission 4 is in the normal shifting position of the first forward gear ratio with respect to the shifting elements. Depending on the speed of the pressure reduction of the shifting element C, the vehicle will be able to begin driving in the desired driving direction more or less quickly after the time point t_4.

The method, according to the invention, described previously on the basis of FIGS. 2 and 2A, for shifting the gearshift from "P→D1" of a vehicle parked on a slope with the engaged positively locked parking brake is also correspondingly possible to other gearshift shifting sequences. Thus, FIG. 3 shows a second shifting diagram of the method, in which a driver shifts the gearshift from "P→D2", when the vehicle, as seen from the viewpoint of the driver in the forward driving direction at the time point of the gearshift is shifted, is on a sufficiently steep roadway gradient with activated or engaged parking brake 8. The gearshift position "P" again indicates the parked position of the transmission 4 or of the vehicle, the gearshift position "D2" represents a forward drive starting in the second gear. From FIG. 3, immediately it can be seen that the first five lines of the shifting diagram, except for the indication of the gearshift position, are identical with the first five lines of the shifting diagram, according to FIG. 2, for which reason repetitive description of the same can be dispensed with at this point.

The sixth line of the shifting diagram, according to FIG. 3, again describes the last step of the method, after the parking brake 8 is disengaged. In contrast to FIG. 2, the shifting element of the transmission 4 at this point are shifted to positions that are normally observed when the gearshift is in the second forward gear ratio. Corresponding to the shifting diagram, according to FIG. 1, the shifting elements A and C are engaged in the second forward gear, and consequently in the last method step, according to FIG. 3, the shifting element D is disengaged at this point, while contrary-wise the two other previously engaged shifting elements A and C remain engaged. Accordingly, the appropriate information of the shifting status of the shifting element D changes.

Figures 4, 4A:
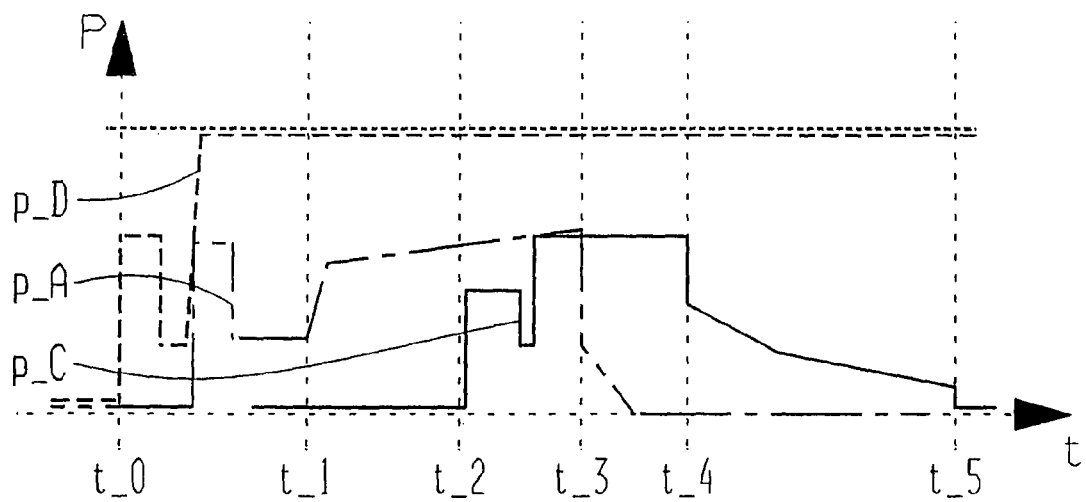
FIG. 4 is a shifting diagram of the method, according to the invention, with a shifting of the gearshift from P→N on a positive roadway slope.
FIG. 4A is a time progression of shifting the gearshift, according to FIG. 4.

With support from the FIGS. 2 and 2A, a shifting process, according to the method, and based on the FIGS. 4 and 4B is described as follows. When the vehicle is parked in a forward driving direction on a sufficiently steep slope, the driver of the vehicle initiates a shifting procedure from "P→N" in order to leave the park position "P" and to engage the frictionally free neutral region "N" of the transmission 4. In FIG. 4 the corresponding shifting diagram is represented in the chronological procession of the individual steps, according to the invention. In FIG. 4A, a chronological procession of the shifting element pressures of the shifting elements participating in the method, corresponding to this shifting diagram, is shown.

From FIG. 4, it is immediately obvious that the first four lines of the shifting diagram, are identical with the first four lines of the shifting diagram, according to FIG. 2, except for the indication of the gearshift position, for which reason repetitive description of the same can be dispensed with at this point. Likewise, the corresponding shifting pressure trends p_D, p_A, p_C of the shifting elements D, A and C in FIG. 4A are identical to the shifting pressure trends p_D, p_A, and p_C at FIG. 2A up to time point t_3.

The fifth line of the shifting diagram, according to FIG. 4, again describes the step of the method in which the positively locked parking brake is released after the locking element of the parking brake is released sufficiently far by engaging a shifting element combination "A+D" such that, as a consequence, the drive train rotated against its strain direction, and after which the output 5 of the vehicle is locked by a frictionally locked a shifting element combination "C+D". The time window, in FIG. 4A, corresponding to the fifth line of the shifting diagram, according to FIG. 4, is the time frame between time points t_3 and t_4. Corresponding to the driver controlled action "N" for the release of the output 5 of the vehicle or for the release of the positively locked element of the parking brake 8, the previously engaged shifting element A is again disengaged. In principle, it is immaterial whether the parking brake 8 within this method step is mechanically disengaged before, during or after disengaging the shifting element A, since the shifting element A does not participate in frictionally locking of the output 5 of the vehicle to the transmission housing. In the present embodiment, according to FIG. 4, the shifting element A is disengaged starting at time point t_3 (pressure trend p_A), for example with a sudden pressure release until a defined value is reached, with subsequent pressure release ramping. During the disengagement of the parking brake 8, the shifting elements D and C (pressure trends p_D and p_C) remain engaged at their current pressure levels, until time point t_3. The torque, acting on the drive shaft 10 of the transmission 4, because of the downhill-slope force on the vehicle, is now counteracted by these two shifting elements D, C on the transmission housing.

The sixth line of the shifting diagram, according to FIG. 4, again describes the last step of the method function, in which the shifting element C, previously locked the drive shaft 10 of the transmission 4, via the engaged parking brake 8 in a state free of strain or partially free of strain, is disengaged at this point in a controlled or regulated manner. In contrast to FIG. 2 and corresponding to the driver control action, the transmission 4 at this point is friction-free, with the shifting element D remaining at its locking pressure in order to shorten the reaction time of a later gear engagement. The example pressure reduction (pressure trend p_C), represented in FIG. 4A of the shifting element C from time point t_4, corresponds to the reduction of pressure, according to FIG. 2A, and the shifting element C is pressureless at time point t_5.

Figures 5, 5A:
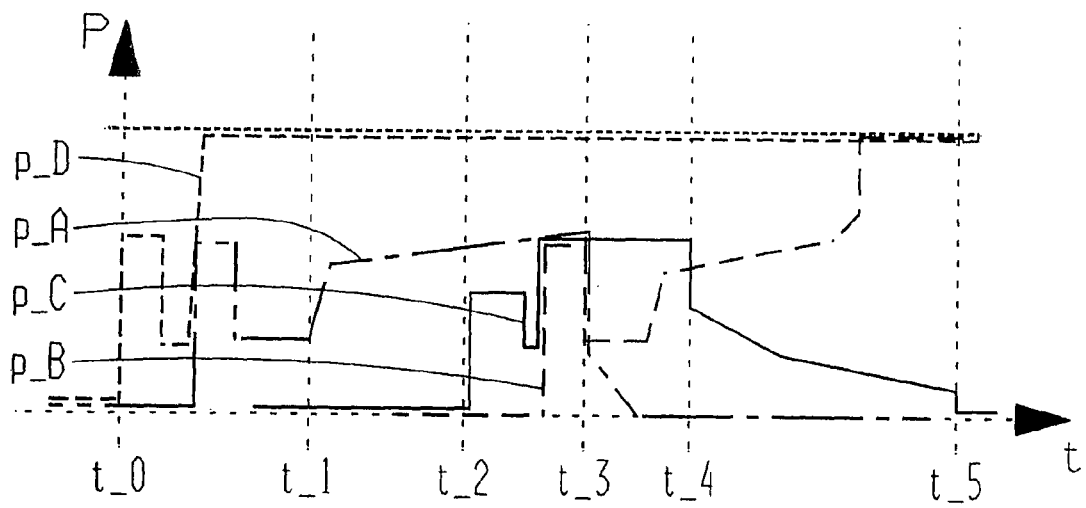
FIG. 5 is a shifting diagram of the method, according to the invention, with a shifting of the gearshift from P→R on a positive roadway slope.
FIG. 5A is a time progression of shifting the gearshift, according to FIG. 5.

With support from the FIGS. 2 and 2A, a shifting process of the method is described on the basis of FIGS. 5 and 5B, when the vehicle, as seen in a forward driving direction, is parked on a sufficiently steep slope and the driver manipulates the vehicle by way of the gearshift with a shift from "P→R" to leave the park position "P" and engage the reverse gear "R" of the transmission 4. In FIG. 5, the corresponding shifting diagram is represented with the chronological process of the individual method steps according to the invention. In FIG. 5A, a chronological procession of the shifting element pressures of the shifting elements participating in the method, corresponding to this shifting diagram, is represented.

From FIG. 5, it is immediately obvious that the first four lines of the shifting diagram are identical with the first four lines of the shifting diagram, according to FIG. 2, or of the shifting diagram, according to FIG. 4, except the indication of the gearshift position, for which reason repetitive description can be dispensed with at this point. Likewise, the corresponding pressure trends p_D, p_A, p_C of the shifting elements D, A and C, according to FIG. 5A, are identical to the pressure trends p_D, p_A, p_C, according to FIG. 2A or FIG. 4A, until time point t_3.

The fifth line of the shifting diagram, according to FIG. 5, again describes the step of the method in which the positively locked parking brake is released, after the parking brake has been sufficiently disengaged by the engagement of a shifting element combination "A+D" which has, as a consequence, rotates the drive train against the direction of its strain, and afterwards the output 5 of the vehicle frictionally locked to the transmission housing by a shifting element combination "C+D". The time span in FIG. 5A, corresponding to the fifth line of the shifting diagram according to FIG. 5, is the time frame between time points t_3 and t_4. Corresponding to the driver controlled action "R", shifting to the reverse gear ratio is prepared for in that the shifting element A (pressure trend p_A), which was previously engaged in releasing the output 5 of the vehicle or for releasing the locking element of the parking brake, is disengaged and the shifting element B (pressure trend p_B), required for the reverse gear ratio is engaged, and the shifting element D, which is necessary in the reverse gear ratio together with shifting element B according to he shifting diagram of the transmission 4 as in FIG. 1A, remains engaged (here with its locking pressure). In principle, it is immaterial whether the parking brake 8 is mechanically disengaged within this method step before, during or after the disengagement of the shifting element A since this shifting element A is not involved in the frictionally locking of the output 5. In the present embodiment, according to FIG. 5A, the shifting element A starting at time point t_3 (pressure trend p_A) is disengaged, for example with a sudden pressure drop to a defined value, with subsequent pressure reduction ramping. In the present embodiment, according to FIG. 5A, the filling pressurizing process of the shifting element B (pressure trend p_B) starts, for example, even before the time point t_3 in order to shorten the reaction time of the selector shifting "P→R," in that a known rapid filling phase of the shifting element B starts sufficiently before time point t_3 and ends at time point t_3, followed by a known filling equilibration phase beginning at time point t_3. In a convenient implementation of the function, the pressure reduction of the shifting element B (pressure trend p_B) occurs in such a manner that shifting element B bears torque no later than time point t_4. During the disengagement of the parking brake 8, the shifting elements D and C (pressure p_D and p_C) remain engaged at their current pressure levels, until time point t_3 and counteracts the torque from the downhill-slope force of the vehicle, acting on the drive shaft 10 of the transmission 4 against the transmission housing.

The sixth line of the shifting diagram, according to FIG. 5, again describes the last step of the method in which the shifting element C, by way of which the drive shaft 10 of the transmission 4 was previously locked by the engaged parking brake 8 in a state relieved of strain or partially relieved of strain, is opened at this point in a controlled or regulated manner. In contrast to FIG. 2, at this point in the transmission 4, a shifting element combination "B+D" is engaged, which corresponds to the driver controlled action "R." In FIG. 5A, it can be seen that in the represented implementation example, the shifting pressure p_B of the shifting element B is increased beginning after time point t_4 to locking pressure, while the shifting pressure p_C of the shifting element C is reduced beginning after time point t_4. Depending on the application of the pressure reduction of the shifting element C, the vehicle will be able to start in the desired driving direction more or less quickly after time point t_4. By time point t_5, the shifting element C is again pressureless.

Deviating from the representation in FIG. 5 or 5A, the present example transmission scheme can also be provided such that the output 5 of the vehicle is not restrained through the simultaneous engagement of the two shifting elements C and D to the transmission housing, but rather through additionally engaging of the shifting element B in addition to the already engaged shifting elements A and D. Since the exact shifting element combination "B+D" is also necessary for the driver desired reverse gear "R", the transmission 4 in this case must be adjusted to this shifting element combination "B+D" in the last method step by disengaging the shifting element A. An improvement in reaction time can be achieved because a shifting element is less involved in the method and a filling process for a shifting element is less necessary.

While the previous FIGS. 2 and 2A through 5 and 5A concern shifting the gearshifts, which the driver undertakes in the forward driving direction on a slope (with sufficiently large positive roadway gradient) with a parked vehicle having an engaged positively locked parking brake, the following FIGS. 6 and 6A through 9 and 9A concern shifting the gearshift, which the driver undertakes in a forward driving direction on a negative slope (with sufficient negative roadway gradient) with a parked vehicle having an engaged positively locked parking brake.

Figures 6, 6A:
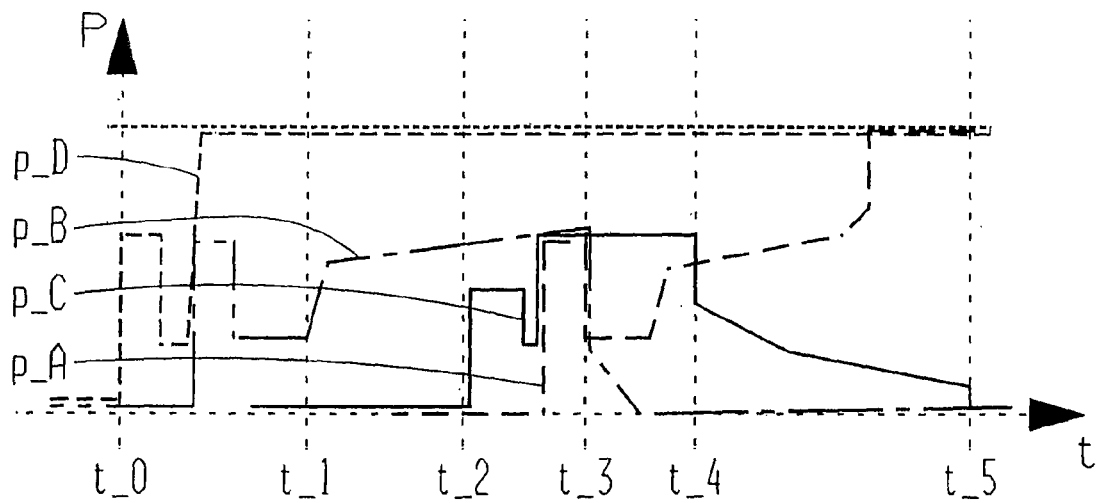
FIG. 6 is a first shifting diagram of the method, according to the invention, with a shifting of the gearshift from P→D1 on a negative roadway slope.
FIG. 6A is a time progression of shifting the gearshift, according to FIG. 6.

FIG. 6 shows a first shifting diagram of the method for a driver controlled action for shifting the gearshift from "P→D1", when the vehicle, at the time the driver shifts the gearshift, is parked in a forward driving direction on roadway negative slope with activated or engaged parking brake 8. As in FIG. 2, the gearshift position "P" indicates the park position of the transmission 4 or of the vehicle, and the gearshift position "D1" represents a forward driving region with automatic gear selection and starting translation "first gear ratio". As in FIG. 2, this shifting diagram, according to FIG. 6, corresponds to a time sequence of the individual method steps upon the disengagement of the parking brake 8, which is indicated by an arrow characterizing a time t. FIG. 6A shows over the course of time the shifting pressures of the shifting elements participating with the shifting of the gearshift, corresponding to FIG. 6, where the herein represented pressure levels and ramping curves and the timing of the individual shifting phases (such as rapid filling phase, pressure equilibration or pressure holding phase, load transfer stage, locking pressure or shifting final pressure phase) are again to be seen as examples.

The first two lines of the shifting diagram, according to FIG. 6, are identical with the first two lines of the shifting diagram, according to FIG. 2. The first line of the shifting diagram describes the initial state before the movement of the gearshift by the driver: if the gearshift position is the park position "P"; the parking brake 8 is mechanically engaged, and thereby the output 5 of the vehicle is positively locked. All shifting elements A through E of the transmission 4 are disengaged, the rotational speed n_mot of the drive motor 2 correspond to a neutral rotational speed n_LL, and the vehicle seen in the forward driving direction on a negative slope, with the roadway gradient smaller than a predefined negative threshold value. The gearshift position indicator, if present, displays "P" and informs the driver of the current park position with the activated positively locked parking brake 8. The second line of the shifting diagram describes the state, as in FIG. 2, in which the driver shifts the gearshift from "P→D1", in other words, the engagement of the first forward gear with the required shifting elements A and D. During the shifting of the gearshift from "P→D1" by the driver, the parking brake 8 is still mechanically engaged, all shifting elements A through E of the transmission 4 are disengaged, the drive motor 2 normally rotates with neutral rotational speed n_LL, but can also rotate with slightly increased rotational speed n_mot by way of a motor control. In the present case, the slope recognition system of the transmission 4 or the vehicle recognizes a sufficiently small negative roadway gradient, in other words, the vehicle is parked in the forward driving direction on a sufficiently steep negative slope.

The third line of the constitutional diagram describes the subsequent steps of the method in which the strain of the drive train 1 of the vehicle is reduced such that a subsequent release of the positively locked parking brake 8 no longer causes a disturbing release jolt. As was already stated, the strain direction on the drive train 1 of the vehicle with engaged positively locked parking brake 8 is independent of whether the future driving direction from the parking position is forward or reverse, but is only dependent on the direction of the roadway gradient, with the locking torque acting on the locking element of the parking brake 8 is a function of the actual downhill-slope force on the vehicle, in other words, primarily a function of the current vehicle mass m and of the roadway gradient. Since in the present case, the vehicle is in a forward driving direction on a negative slope, the strain on the drive train 1 of the vehicle works in the forward driving direction, in contrast to FIG. 2. For the release of the drive train and of the engaged positive locking element of the parking brake, a combination of shifting elements is engaged, which corresponds to the reverse gear of the transmission 4, according to the invention in the method step of the third line of the shifting diagram according to FIG. 6, with engaged parking brake 8 and indicator "P" of the gearshift position indicator being unchanged. Thereby, the two friction locking shifting elements B and D are made to slip for the transmission of torque in such a manner that the (downhill-slope) force, acting through the drive shaft 10 of the transmission 4 on the parking pawl or parking brake 8, is eliminated or at least greatly reduced or even slightly overcompensated. In order that sufficient leverage of the transmission 4 is provided or the transmission engagement torque, necessary to overcome the downhill-slope force of the vehicle in this state of the transmission 4, is provided. The invention can be provided in a configuration similar to that shown in FIG. 2, such that the normally very low rotational speed n_mot of the drive motor 2 in neutral and, if necessary, also the torque of the drive motor 2 can be increased in the method step of the third line of the shifting diagram, where such a rotation speed or torque increase of the drive motor 2, as in FIG. 2, can be preset or controlled as a function of the current roadway gradient, the vehicle mass m, a transmission temperature T and/or parameters of the starting element 3 or torque converter of the transmission 4.

As in FIG. 2A, time points t_0 and t_2 in FIG. 6A correspond to FIG. 6 and mark the chronological time point of the method step of the third line of the shifting diagram, represented according to FIG. 6. At time point t_0 in the represented example, no shifting element relevant for the shifting process is engaged, in other words, all of the relevant shifting elements for the shifting process are still unpressurized. Since in the present case, depending on the type of construction of the transmission, two frictionally locked shifting elements are again necessary for a later driving process, the pressure trends of the course of the can also be provided in another configuration deviating from the example represented in FIG. 6A, such that at least one of the shifting elements required for starting—especially the shifting element D, required in both the first forward gear ratio and also in the reverse gear ratio—is already pressurized in the park position "P". Within the time frame between time points t_0 and t_2 the two shifting elements B and D are engaged (pressure trends p_B and p_D) where, for example, the shifting element D is first brought to a locking pressure before the shifting element B assumes torque. At time point t_1, the shifting element B is also pressurized. Within the time frame between time points t_1 and t_2, the shifting element B assumes torque. Corresponding to the shifting diagram according to FIG. 1, of the transmission 4, the controlled shifting element combination "B+D" corresponds to the reverse gear ratio of the transmission 4 so that the drive train 1 of the vehicle, which is strained in the forward driving direction, corresponding to the roadway gradient (grad), begins to be release with the beginning of torque transfer to the shifting element B. At time point t_2, the positively locked parking brake 8 is released.

The fourth line of the shifting diagram, according to FIG. 6, describes the subsequent step of the method function in which the output 5 of the vehicle is held with a parking brake 8 relaxed or partially relaxed through the movement of an additional frictionally locked shifting element to the housing of the transmission 4. For this purpose, with the engaged parking brake 8 and indication "P" of the gearshift position indicator remaining unchanged, in addition to the engaged shifting elements B and D in the previous method step, the shifting element C is engaged. Thereby, the current pressure level of the three shifting elements B, D and C is allocated in such a manner that the transmission 4 is locked or that the torque, acting through the downhill-slope force on the vehicle on the drive shaft 10 of the transmission 4, is counteracted. Hereby, similar to the previous method step, an increase of the rotational speed n_mot of the drive motor 2 to a level greater than the neutral rotational speed n_LL, and an increase of the torque of the drive motor 2, can be provided in order to guarantee the leverage provision of the transmission 4 and the transmission starting torque necessary to overcome the downhill-slope force. A rotational speed or torque increase can occur, according to a similar algorithm, as described in the previous method step, as a function of the current roadway gradient, the vehicle mass m, a transmission temperature T and/or parameters of the starting element 3 or of the torque converter of the transmission 4.

In FIG. 6A, corresponding to FIG. 6, time points t_2 and t_3 mark the sequential time point of the method step represented in the fourth line of the constitutional diagram in FIG. 6. Within the time frame between the time points t_2 and t_3, the shifting element C is engaged (pressure curve p_C), so no later than time point t_3, the drive shaft 10 of the transmission 4 is locked to the transmission housing. As in FIG. 2A, it is also indicated in FIG. 6A that through the various pressure levels of the shifting pressure curves p_C, p_D of the shifting elements C, D, it is possible to control or regulate the current shifting pressures of the engaged shifting elements individually within the framework of the method. Thus, in the present embodiment, the shifting pressure p_C of the shifting element C, which is again disengaged later in the course of the method after the mechanical disengagement of the parking brake 8, for example, is lower than the shifting pressure p_D of the shifting element D, which remains engaged even after the disengagement of the shifting element C.

The fifth line of the constitutional diagram, according to FIG. 6, describes the subsequent step of the method in which the positively locked parking brake 8 is released, in other words, the parking brake 8 is mechanically disengaged. Correspondingly, information concerning the engagement status of the parking brake 8 is changed, along with the indication of the gearshift position, if present. The shifting element B, which does not participate in the frictionally locking of the output 5 of the vehicle and is also unnecessary for the further span of the method corresponding to the undertaken driver controlled action to engage first forward gear, is disengaged. In contrast the other two previously engaged shifting elements D and C remain engaged. A possible previously activated rotational speed increase for the drive motor 2 is neglected so that the drive motor 2 at this point again rotates at the neutral rotational speed n_LL or with a slightly increased rotational speed n_mot, through neutral regulation of the motor control adjusted to the motor load.

The time span in FIG. 6A, corresponding to the fifth line of the shifting diagram, according to FIG. 6, is the time range between time points t_3 and t_4. Corresponding to the driver controlled action "D1", shifting into the first forward gear ratio is prepared for, in that the shifting element B (pressure curve p_B), which was previously engaged for the release of the output 5 of the vehicle or for the release of the locking element of the parking brake, is again disengaged and the shifting element A (pressure curve p_A), required for the first forward driving gear ratio, is engaged. The shifting element D, required together with the shifting element A, for the first forward gear ratio, according to the shifting diagram of the transmission 4 represented in FIG. 1A, remains engaged (here at its locking pressure). In principle, it is immaterial whether the parking brake 8 within this method step is mechanically disengaged before, during or after disengaging the shifting element B since the shifting element B does not participate in frictionally locking the output 5 of the vehicle to the transmission housing. In the present embodiment, according to FIG. 6A, the shifting element B is disengaged beginning at time point t_3 (pressure curve p_B) with an initially steep, two-step pressure release ramping. No later than time point t_4, the shifting element B is pressureless. In the present embodiment, according to FIG. 6A, the process of pressurizing the shifting element A (pressure curve p_A) starts, for example even before time point t_3 to shorten the reaction time of shifting the gearshift from "P→D1", in that a known rapid pressurizing phase of the shifting element A starts sufficiently before time point t_3 and ends at time point t_3, followed by a known filling equilibration phase beginning at time point t_3. In a convenient implementation of the function, the pressure reduction of the shifting element A (pressure curve p_A) occurs in such a manner that this shifting element A bears torque no later than time point t_4. During the disengagement of the parking brake 8, the shifting elements D and C (pressure curves p_D and p_C) remain engaged at their current pressure levels until time point t_3 and counteracts the torque acting, through the downhill-slope force on the vehicle, to the drive shaft 10 of the transmission 4 against the transmission housing.

The sixth line of the shifting diagram, according to FIG. 6, again describes the last step of the method in which the shifting element C, by way of which the drive shaft 10 of the transmission 4 was previously locked by the engaged parking brake 8 in a state relieved of strain or partially relieved of strain, is disengaged at this point in a controlled or regulated manner. In the transmission 4, at this point a shifting element combination "A+D" is engaged, which corresponds to the driver controlled action "first gear ratio." In FIG. 6A, it can be seen in the shown embodiment, the shifting pressure p_A of the shifting element A is increased to locking pressure beginning at time point t_4, while the shifting pressure p_C of the shifting element C is reduced, according to a defined algorithm, beginning at time point t_4. Depending on the pressure reduction of the shifting element C, the vehicle can start in the desired driving direction more or less rapidly after time point t_4. At time point t_5, the shifting element C is again pressureless.

Deviating from the representation in FIG. 6 or 6A in the present example transmission scheme, it can also be provided that the output 5 of the vehicle is not held by simultaneously locking the two shifting elements C and D to the transmission housing, but rather by additionally locking the shifting element A, in addition to the already engaged shifting elements B and D. Since the exact shifting element combination "A+D" is also required for the first forward gear ratio, desired by the driver, the transmission 4, in this case in the last method step, must be shifted to this shifting element combination "A+D" through the disengagement of the shifting element B. An improvement in reaction time can be achieved because a shifting element is less involved in the method and a process for pressurizing a shifting element is less necessary, a reaction time improvement can be achieved.

The method, according to the invention, previously described on the basis of the FIGS. 6 and 6A, for shifting the gearshift from "P→D1" of a vehicle parked on a negative slope with an engaged positively locked parking brake is also correspondingly transferable to other gearshifts. Thus, FIG. 7 shows, with support from FIG. 3, a second example shifting diagram of the method at this point for a driver controlled action for shifting the gearshift from "P→D2," when the vehicle, at the time the driver shifts the gearshift, as in FIG. 6, is parked in the forward driving direction on a sufficiently steep roadway negative slope with activated or engaged parking brake 8. The gearshift position "P" again indicates the parking position of the transmission 4 or of the vehicle and the gearshift position "D2" represents forward drive starting in the second gear ratio. From FIG. 7, it can be immediately seen that the first five lines of the shifting diagram, except the indication of the gearshift position, are identical with the first five lines of the shifting diagram, according to FIG. 6, for which reason an additional description can be dispensed with at this point.

The sixth line of the shifting diagram, according to FIG. 7, again describes the last step of the method after the parking brake 8 has been disengaged. In contrast to FIG. 6, at this point the transmission 4 is adjusted to the normal shifting position of the second forward gear with respect to the shifting elements. Corresponding to the shifting diagram, according to FIG. 1 in the second forward gear ratio, the shifting elements A and C are engaged, consequently, in the last step according to FIG. 7, at this point the shifting element D is disengaged while, in contrast, the two previously engaged shifting elements A and C, remain engaged. Information concerning the shifting status of the shifting element D changes accordingly.

Figures 8, 8A:
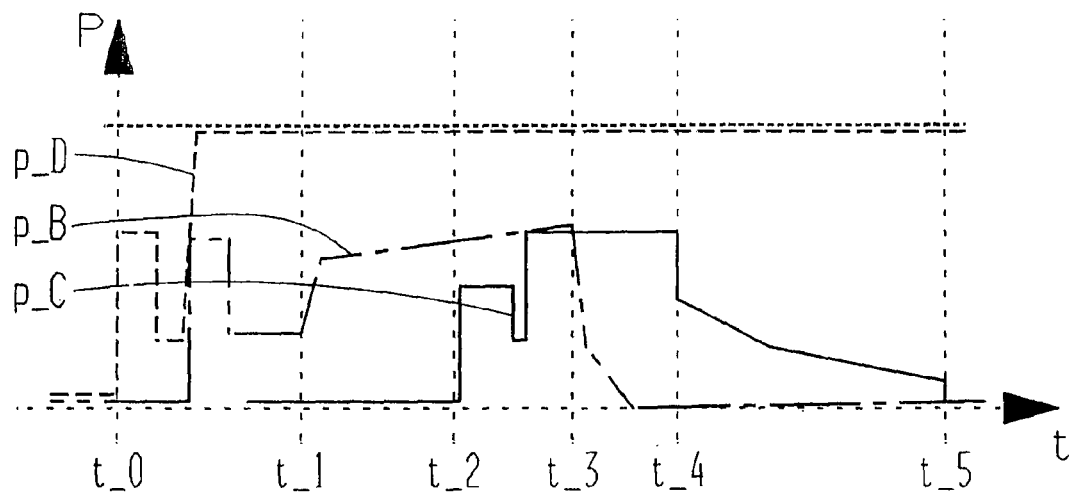
FIG. 8 is a shifting diagram of shifting the gearshift, according to the invention with a shifting of the gearshift from P→N on a negative roadway slope.
FIG. 8A is a time progression of shifting the gearshift, according to FIG. 8.

With support from the FIGS. 4 and 4A, in the following, on the basis of FIGS. 8 and 8B, sequential shifting according to the method is described, when the vehicle is parked in the forward driving direction on a sufficiently steep negative slope and the driver of the vehicle undertakes by way of the driver shifting the gearshift from "P→N" for leaving the park position "P" and engaging the power free neutral range "N" of the transmission 4. In FIG. 8, the corresponding shifting diagram is represented with the time sequence of the individual method steps. FIG. 8A represents a time sequence of the shifting element pressures of the shifting elements involved in the method corresponding to this shifting diagram.

From FIG. 8, it can immediately be seen that the first four lines of the constitutional diagram, except the indication of the gearshift position, are identical with the first four lines of the shifting diagram, according to FIG. 6, for which reason an additional description can be excluded at this point. Also the corresponding shifting pressure curves p_D, p_B, p_C of the shifting elements D, B and C, according to FIG. 8A, are identical to the shifting pressure curves p_D, p_B, p_C, until time point t_3, according to FIG. 6A. Since the driver has requested the neutral position "N" through the driver's control action, according to FIG. 8 in contrast to FIG. 6A, the shifting element A is not involved in the method. Consequently, no rapid filling for the shifting element A is listed in FIG. 8A shortly before time point t_3.

The fifth line of the shifting diagram, according to FIG. 8, again describes the step of the method in which the positively locked parking brake is released after the locking element of the parking brake is sufficiently relaxed through the engagement of a shifting element combination "B+D", which has as a consequence, rotation of the drive train against its strain direction, and after the output 5 of the vehicle is locked in a frictionally locked manner through a shifting element combination "C+D". The time span, corresponding to the fifth line of the shifting diagram, according to FIG. 8 in FIG. 8A, is the time frame between time points t_3 and t_4. Corresponding to the driver controlled action "N", for the release of the output 5 of the vehicle or for the release of the engaged positive locking element of the parking brake 8, the previously engaged shifting element B is again disengaged. In principle, it is immaterial whether the parking brake, within this method step, is mechanically disengaged before, during or after disengaging the shifting element B since the shifting element B does not participate in frictionally locking the output 5 to the vehicle on the transmission housing. In the present embodiment, according to FIG. 8A, the shifting element B is disengaged beginning at time point t_3 (pressure curve p_B), for example over a two-step pressure reduction ramping with a steep initial gradient. During the disengagement of the parking brake 8, the shifting elements D and C (pressure curves p_D and p_C) remain engaged at their current pressure levels of time point t_3, where the vehicle torque, acting on the drive shaft 10 of the transmission 4 from the downhill-slope force on vehicle, is counteracted through frictionally locking these two shifting elements D, C to the transmission housing.

The sixth line of the shifting diagram, according to FIG. 8, again describes the last step of the method in which the shifting element C, by way of which the drive shaft 10 of the transmission 4 was previously locked by the engaged parking brake 8 in a state relieved of strain or partially relieved of strain, is disengaged at this point in a controlled or regulated manner. Corresponding to the driver controlled action, the transmission 4, at this point, is free of frictional locking where, for example, the shifting element D remains engaged at its locking pressure, in order to reduce the reaction time for later gear engagement. The example reduction of reduction (pressure curve p_C, represented in FIG. 8A of the shifting element C, from time point t_4 corresponds to the pressure reduction according to FIG. 6A.

Figures 9, 9A:
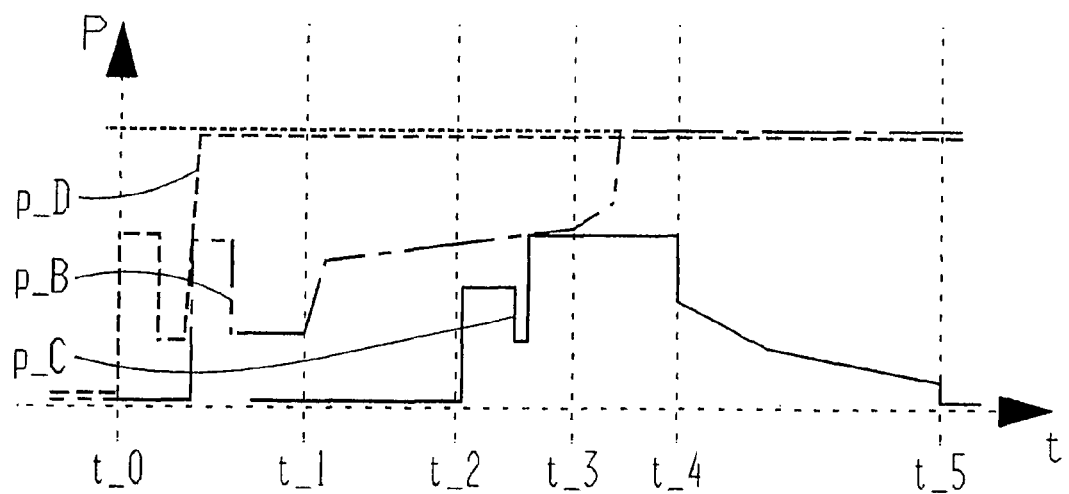
FIG. 9 is a shifting diagram of the method, according to the invention, with a shift of the gearshift from P→R on a negative roadway slope.
FIG. 9A is a time progression of shifting the gearshift, according to FIG. 9.

With support from FIGS. 5 and 5A, on the basis of the FIGS. 9 and 9B, a shifting method according to the inventive method is described, when the vehicle is parked in the forward driving direction on a sufficiently steep slope and the driver of the vehicle shifts the gearshift from "P→R", by way of the gearshift, for leaving the park position "P" and the engaging the reverse gear ratio "R" of the transmission 4. In FIG. 9, the corresponding shifting diagram with the time course of the individual method steps is represented. In FIG. 9A, a time sequence of the shifting element pressures of the shifting elements involved in the method corresponding to this shifting diagram is represented.

From FIG. 9, it is immediately obvious that the first four lines of the shifting diagram, except for the indication of the gearshift position, are identical with the first four lines of the shifting diagram, according to FIG. 6, for which reason an additional description can be excluded at this point. Likewise, the corresponding pressure curves p_D, p_B and p_C of the shifting elements D, B and C, according to FIG. 9A, are identical to the pressure curves p_D, p_B, p_C according to FIG. 6A, until the time point t_3.

Deviating from the representation in FIG. 9, in another implementation of the method, the method step represented in line four in which the drive of the vehicle is locked by frictionally locking the shifting elements of the transmission to the transmission housing, can be completely dispensed with since the shifting elements B and D, which were previously engaged to reduce strain on the engaged positively locked element of the parking brake 8, make driving the vehicle in the "R" gear ratio, requested by the driver, possible.

The fifth line of the shifting diagram, according to FIG. 9, again describes the last step of the method function in which the positive locking of the parking brake is released after the locking element of the parking brake is sufficiently by engaging a shifting element combination "B+D" which, as a consequence, rotates the drive train against its strain direction, and after the output 5 of the vehicle is restrained by frictionally locking a shifting element combination "C+D" to the transmission housing. The time span in FIG. 9A, corresponding to the fifth line of the constitutional diagram according to FIG. 9, is the time frame between time points t_3 and t_4. In contrast to the method step, according to FIG. 6 or 6A, at this point there is no longer a required change of the shifting element combination so that, at the end of this method step, the drive shaft 10 of the transmission 4 can be rotated in the direction corresponding to the driver controlled action "R"; the shifting elements B and D, which were previously engaged to relax the strain on the output 5 or on the parking brake, are the shifting elements required for the realization of the driver is target gear ratio "R". While the positively locked parking brake 8 is released in the method step, between time points t_3 and t_4, the shifting pressure p_B of the shifting element B is increased to a locking pressure, such that the torque acting on the drive shaft 10 of the transmission 4 through the downhill-slope force of the vehicle, is counteracted against the transmission housing only by way of the shifting elements C and D (pressure curves p_C, p_D). Information of the state of the shifting element B, it is indicated with brackets that this shifting element B is not required for the frictionally locking the output 5 and, therefore, does not necessarily need to be locked.

The sixth line of the shifting diagram, according to FIG. 9, again describes the last step of the method in which the shifting element C, by way of which the drive shaft 10 of the transmission 4 was previously locked by the engaged parking brake 8 in a state relieved of strain or partially relieved of strain, is disengaged at this point in a controlled or regulated manner. The two shifting elements C and D, required for the reverse gear ratio are already at their maximum pressure levels (locking pressure). Beginning at time point t_4, the shifting pressure p_C of the shifting element C is reduced, according to a defined algorithm, in a controlled or regulated manner by a two step pressure reduction ramp, which begins after a sudden negative pressure jump. Depending on the application of this pressure reduction on shifting element C, the vehicle will be able to begin to drive in the desired driving direction more or less quickly after time point t_4. At time point t_5, the shifting element C is again pressureless.

REFERENCE NUMERALS 1 drive train
2 drive motor
3 starting element
4 transmission
5 output
6 first planetary system of the transmission
7 second planetary system of the transmission
8 parking brake
9A drive wheel of the vehicle
9B drive wheel of the vehicle
10 drive shaft of the transmission
A, B, E, C, D shifting elements
D1, D2, N, P, R gearshift positions
grad roadway gradient
n_LL neutral rotational speed of the drive motor
n_mot rotational speed of the drive motor
m mass
p pressure
p_A, p_B, p_C, p_D pressure curves of the shifting elements A, B, C, and D
t time
t_0, t_1, t_2, t_3, t_4 time points
T temperature

The invention claimed is:

1. A method of controlling a transmission (4) of a vehicle having multiple frictionally engageable shifting elements (A, B, C, D, E) and a parking brake (8), which has a positive locking element for engaging an output (5) of a drive train (1), the method being initiated upon a driver's control action for disengagement of the parking brake (8) from the output (5) and when a roadway gradient (grad) is one of greater than a preset first positive threshold value or smaller than a preset first negative threshold value, the method comprising the steps of:

slidably engaging one of a combination of a first shifting element (A) and a fourth shifting element (D) and a combination of a second shifting element (B) and a fourth shifting element (D) depending on the roadway gradient (grad) such that the output (5) rotates in a direction opposite to a strain force acting between the engaged positive locking element of the parking brake (8) and the output (5) until the strain force is at least partially eliminated;

engaging at least one of a third shifting element (C), the first shifting element (A) and the second shifting, element (B) to lock the output (5);

disengaging the positive locking element of the parking brake (8) from the output (5); and controllably disengaging at least one of the third shifting element (C), the first shifting element (A) and the second shifting element (B) from the output (5) such that the output (5) is rotatable in a direction corresponding to the driver's control action.

2. A method of controlling a transmission (4) of a vehicle having multiple frictionally engageable shifting elements (A, B, C, D, E) and a parking brake (8), which has a positive locking element for engaging an output (5) of a drive train (1), the method being initiated upon a driver's control action for disengagement of the parking brake (8) from the output (5) and when a roadway gradient (grad) is one of greater than a preset first positive threshold value or smaller than a preset first negative threshold value, the method comprising the steps of:

slidably engaging one of a combination of a first shifting element (A) and a fourth shifting element (D) and a combination of a second shifting element (B) and a fourth shifting element (D) depending on the roadway gradient (grad) such that the output (5) rotates in a direction opposite to a strain force acting between the engaged positive locking element of the parking brake (8) and the output (5) until the strain force is at least partially eliminated;

engaging at least one of a third shifting element (C), the first shifting element (A) and the second shifting element (B) to lock the output (5);

disengaging the positive locking element of the parking brake (8) from the output (5); and controllably disengaging at least one of the third shifting element (C), the first shifting element (A) and the second shifting element (B) from the output (5) such that the output (5) is rotatable in a direction corresponding to the driver's control action; and engaging at least one of the third shifting element (C), the first shifting element (A) and the second shifting element (B) to lock the output (5) and controllably disengaging at least one of the third shifting element (C), the first shifting element (A) and the second shifting element (B) from the output (5), if the output (5) rotates, in accordance with the driver's control action, by slidably engaging one of the combinations of the first shifting element (A) and the fourth shifting element (D) and the second shifting element (B) and the fourth shifting element (D).

3. The method according to claim 1, further comprising the step of slidably engaging both the first shifting element (A) and the fourth shifting element (D) when the roadway gradient (grad) is greater than the preset first positive threshold value, and the driver's control action relates to engaging a forward gear ratio in the transmission (4).

4. The method according to claim 3, further comprising the step of engaging one of a first forward gear ratio, a second forward gear ratio, a third forward gear ratio, a fourth forward gear ratio, a fifth forward gear ratio and a sixth forward gear ratio of the transmission (4) as the forward gear ratio in the transmission (4).

5. The method according to claim 1, further comprising the step of slidably engaging both the second shifting element (B) and the fourth shifting element (D) when the roadway gradient (grad) is smaller than the preset first negative threshold value and the driver's control action relates to engaging a reverse gear ratio in the transmission (4).

6. The method according to claim 1, further comprising the step of controlling at least one of the first shifting element (A), the second shifting element (B) and the fourth shifting element (D) from one of the combinations of the first shifting element (A) and the fourth shifting element (0) and the second shifting element (B) and the fourth shifting element (D) depending on at least one of the roadway gradient (grad), a vehicle mass (m), a transmission temperature (T), and a temperature related to the transmission temperature (T).

7. The method according to claim 1, further comprising the step of controlling at least one of the third shifting element (C), the first shifting element (A) and the second shifting element (B) depending on at least one of the roadway gradient (grad), a vehicle mass (m), a transmission temperature (T), and a temperature related to the transmission temperature (T).

8. The method according to claim 1, further comprising the step of engaging a gear ratio in the transmission (4) when engaging the one of the third shifting element (C), the first shifting element (A) and the second shifting element (B) while locking the output (5).

9. The method according to claim 1, further comprising the step of engaging one of the first shifting element (A) and the second shifting element (B), required for initiating driving the vehicle in relation to the driver's control action, beginning at engagement of the at least one of the third shifting element (C), the first shifting element (A) and the second shifting element (B) to lock the output (5), when the direction of the strain force is different from the rotational direction of the output (5) corresponding to the driver's control action and when the parking brake (8) is engaged.

10. The method according to claim 1, further comprising the step of engaging one of the first shifting element (A) and the second shifting element (B), required for initiating driving the vehicle in relation to the driver's control action, beginning at disengagement of the positive locking element of the parking brake (8) from the output (5), when the direction of the strain force is different from the rotational direction of the output (5) corresponding to the driver's control action and when the parking brake (8) is engaged.

11. The method according to claim 1, further comprising the step of disengaging one of the first shifting element (A) and the third shifting element (B), that is slidably engaged to rotate the output (5) and not engaged to lock the output (5), when disengaging the positive locking element, when the direction of the strain force is different from the rotational direction of the output (5) corresponding to the driver's control action and when the parking brake (8) is engaged.

12. The method according to claim 1, further comprising the step of adjusting at various levels a transfer capacity of at least one of the first shifting element (A), the second shifting element (B), the third shifting element (C), and the fourth shifting element (D), which is engaged to lock the output (5) such that the transfer capacity of one of the first shifting element (A), the second shifting element (B), and the third shifting element (C), which is disengaged after the disengagement of the parking brake (8), is smaller than the transfer capacity of the fourth shifting element (D).

13. The method according to claim 1, further comprising the step of reducing a transfer capacity by the controllable disengagement of the one of the first shifting element (A), the second shifting element (B), the third shifting element (C), which was engaged to lock the output (5) such that the strain force on the output (5) is continuously reduced.

14. The method according to claim 1, further comprising the step of, when the roadway gradient (grad) is greater than the predefined first positive threshold value and the driver's control action initiates forward drive, preventing the controllable disengagement of the one of the first shifting element (A), the second shifting element (B), the third shifting element (C) from the output (5).

15. The method according to claim 1, further comprising the step of at least one of:
when the roadway gradient (grad) is greater than the predefined first positive threshold value and the driver's control action initiates forward drive, controllably engaging a forward gear ratio;
when the roadway gradient (grad) is greater than the predefined first positive threshold value and the drivers control action initiates reverse drive, controllably engaging a reverse gear ratio; and
when the roadway gradient (grad) is smaller than the predefined first negative threshold value and the driver's control action initiates forward drive, controllably engaging a forward gear ratio.

16. The method according to claim 15, further comprising the step of controllably disengaging at least one of the third shifting element (C), the first shifting element (A) and the second shifting element (B) from the output (5) to engage the first forward gear ratio of the vehicle transmission (4).

17. The method according to claim 1, further comprising the step of, when the roadway gradient (grad) is smaller than the predefined first negative threshold value and the driver's control action initiates forward drive, omitting a change of gear ratio.

18. The method according to claim 1, further comprising the step of increasing of at least one of a rotational speed (n_mot) and a torque of a drive motor (2) to a value higher than at least one of a neutral rotational speed (n_mot) and a neutral torque of the drive motor (2) during the steps of partially engaging one of the combinations of the first shifting element (A) and the fourth shifting element (D) and the second shifting element (B) and the fourth shifting element (D) and engaging at least one of the third shifting element (C), the first shifting element (A) and the second shifting element (B) to lock the output (5).

19. The method according to claim 18, further comprising the step of increasing at least one of the rotational speed (n_mot) and the torque of the drive motor (2) depending on at least one of the roadway gradient (grad), a vehicle mass (m), a transmission temperature (T), a temperature representing the transmission temperature (T), parameters of a starting element (3), and parameters of a torque converter of the transmission (4).

20. The method according to claim 1, further comprising the step of prematurely terminating the method of controlling the transmission (4), immediately disengaging the parking brake (8), and simultaneously engaging a gear ratio according to the drivers control action when a sliding force of the parking brake (8) is larger than a predefined value.

21. The method according to claim 1, further comprising the step of at least one of prematurely terminating the method of controlling the transmission (4) after maximum reduction of the strain force on the parking brake (B), immediately disengaging the parking brake (8) and simultaneously engaging a gear ratio according to the driver's control action, when the roadway gradient (grad) is one of greater than a preset second positive threshold value and smaller than a preset second negative threshold value, the preset second negative threshold value is smaller than the preset first negative threshold value.

22. The method according to claim 1, further comprising the step of prematurely terminating the method of controlling the transmission (4) before the step of slicably engaging one of the combinations of the first shifting element (A) and the fourth shifting element (D) and the second shifting element (B) and the fourth shifting element (D) and immediately disengaging the parking brake (8) when the roadway gradient (grad) is one of greater than a preset second positive threshold value and smaller than a preset second negative threshold value, the preset second positive threshold value is greater than the preset first positive threshold value and the preset second negative threshold value is smaller than the preset first negative threshold value.

23. The method according to claim 22, further comprising the step of at least one of:
fixing the value of at least one of the preset first positive threshold value, the preset second positive threshold value, the preset first negative threshold value and the preset second negative threshold value; and one of presetting and adaptively determining, depending on a vehicle mass (m), the value of at least one of the preset first positive threshold value, the preset second positive threshold value, the preset first negative threshold value and the preset second negative threshold value.

24. The method according to claim 1, further comprising the step of at least one of:

determining the roadway gradient (grad) with a vehicle-equipped slope sensor; and determining the roadway gradient (grad) with a map-supported navigation system of the vehicle.

25. The method according to claim 24, further comprising the step of at least one of predefining the vehicle mass (m) as a fixed value; and adapting a value of the vehicle mass (m) by estimating the current vehicle mass with consideration given to at least one of:

a comparison of a theoretical vehicle acceleration with an actual vehicle acceleration determined before a preceding activation of the parking brake (8);

a spring constant of a chassis suspension and one of a current individual wheel deflection and an axle deflection on a chassis of the vehicle;

wheel pressure values of an air suspension of the vehicle;

a signal of a level regulator of an axle of the vehicle;

a permanent fixed predefined trailer mass value, and a trailer mass when pulling of a trailer is recognized.

* * * * *